(12) United States Patent
Meng et al.

(10) Patent No.: US 8,023,066 B2
(45) Date of Patent: Sep. 20, 2011

(54) ONE-PIECE BACKLIGHT MODULE AND LIQUID CRYSTAL DISPLAY DEVICE USING SAME

(75) Inventors: Kai Meng, Shenzhen (CN); Che-Kuei Mai, Miao-Li (TW)

(73) Assignees: Innocom Technology (Shenzhen) Co., Ltd., Shenzhen, Guangdong Province (CN); Chemi Innolux Corporation, Miao-Li County (TW)

( * ) Notice: Subject to any disclaimer, the term of this patent is extended or adjusted under 35 U.S.C. 154(b) by 761 days.

(21) Appl. No.: 11/901,373

(22) Filed: Sep. 17, 2007

(65) Prior Publication Data

US 2008/0068534 A1 Mar. 20, 2008

(30) Foreign Application Priority Data

Sep. 15, 2006 (TW) .............................. 95134272 A (51) Int. Cl.
*G02F 1/1335* (2006.01)

(52) U.S. Cl. .............................. 349/62; 349/61; 349/69

(58) Field of Classification Search .................... 349/61, 349/62, 69
See application file for complete search history.

(56) References Cited

U.S. PATENT DOCUMENTS

| | | | |
|---|---|---|---|
| 5,828,488 A * | 10/1998 | Ouderkirk et al. | 359/487 |
| 7,032,509 B2 | 4/2006 | Kim | |
| 7,106,395 B2 | 9/2006 | Maeda | |
| 7,443,585 B2 | 10/2008 | Hara et al. | |
| 2004/0233372 A1* | 11/2004 | Park | 349/149 |
| 2005/0151896 A1* | 7/2005 | Hara et al. | 349/96 |
| 2009/0284687 A1* | 11/2009 | Kirita et al. | 349/65 |

FOREIGN PATENT DOCUMENTS

TW I258603 B 7/2006

* cited by examiner

*Primary Examiner* — Nathanael R Briggs
(74) *Attorney, Agent, or Firm* — Wei Te Chung (57) ABSTRACT

An exemplary one-piece backlight module (200) includes a brightness enhancement unit (240); and a light emitting unit (260) including a first electrode layer (261), a second electrode layer (264), and a light emitting layer (262) between the first and second electrode layers. The brightness enhancement unit and the light emitting unit are stacked one above the other. A liquid crystal display device using the backlight module is also provided.

18 Claims, 5 Drawing Sheets

ONE-PIECE BACKLIGHT MODULE AND LIQUID CRYSTAL DISPLAY DEVICE USING SAME

CROSS-REFERENCE TO RELATED APPLICATION

This application is related to, and claims the benefit of, a foreign priority application filed in Taiwan as Serial No. 095134272 on Sep. 15, 2006. The related application is incorporated herein by reference.

FIELD OF THE INVENTION

The present invention relates to backlight modules such as those used in liquid crystal display (LCD) devices; and particularly to a backlight module constituted as a single unitary body, and an LCD device using the backlight module.

BACKGROUND

LCD devices are commonly used as displays for compact electronic apparatuses. This is because they not only provide good quality images with little power consumption, but they are also very thin. The liquid crystal material in an LCD device does not emit any light itself. The liquid crystal material has to be lit by a light source so as to clearly and sharply display text and images. Thus, a backlight module is generally needed for an LCD device.

Figure 9:
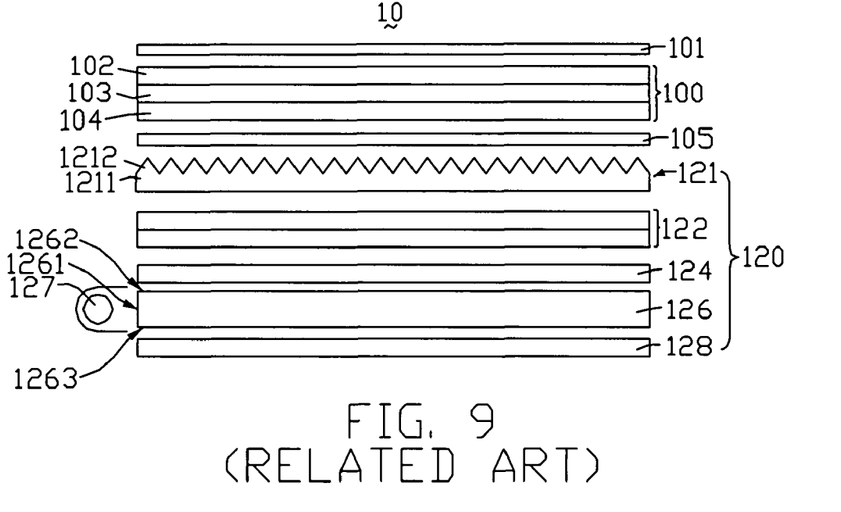
FIG. 9 is an exploded, side view of a conventional LCD device.

Referring to FIG. 9, a conventional LCD device 10 includes an upper polarizing film 101, a liquid crystal panel 100, a lower polarizing film 105, and a backlight module 120. The upper polarizing film 101 and the lower polarizing film 105 are attached on surfaces of two opposite sides of the liquid crystal panel 100, respectively. The backlight module 120 provides light beams to illuminate the liquid crystal panel 100. The liquid crystal panel 100 includes an upper substrate 102, a lower substrate 104, and a liquid crystal layer 103 between the upper and lower substrates 102, 104.

The backlight module 120 includes an upper brightness enhancement film (BEF) 121, a lower BEF 122, a diffusing film 124, a light guide plate (LGP) 126, a reflective film 128, and a light source 127. The LGP 126 has a light incident surface 1261, a top light emitting surface 1262 adjacent to the light incident surface 1261, and a bottom surface 1263 adjacent to the light incident surface 1261. The upper BEF 121, the lower BEF 122, and the diffusing film 124 are arranged in that order from top to bottom above the light emitting surface 1262. The reflective film 128 is arranged at the bottom surface 1263. The light source 127 is adjacent to the light incident surface 1261. The backlight module 120 is a side-edge type backlight unit, and the light source 127 may be a cold cathode fluorescent lamp (CCFL).

The upper BEF 121 includes a main body 1211, and a plurality of linear prism structures 1212 formed at a top of the main body 1211. The lower BEF 122 is similar to the upper BEF 121. However, linear prism structures (not labeled) of the lower BEF 122 are perpendicular to the prism structures 1212 of the upper BEF 121.

Figure 10:
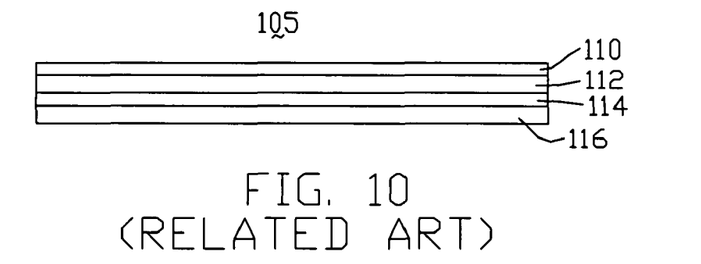
FIG. 10 is a side view of a lower polarizing film of the LCD device of FIG. 9.

Referring to FIG. 10, the lower polarizing film 105 includes an adhesive layer 110, a protective film 112, a polarizing base 114, and a supporting plate 116, stacked in that order from top to bottom. The adhesive layer 110 is attached on the lower substrate 104 of the liquid crystal panel 100. The supporting plate 116 is used to support the polarizing base 114, and the protective film 112 is used to protect the polarizing base 114. The upper polarizing film 101 has a structure substantially the same as that of the lower polarizing film 105.

The backlight module 120 is a side-edge type backlight unit. Therefore the LGP 126 converts linear light beams emitted by the light source 127 into planar light beams. However, the conversion may be imperfect or incomplete, with the planar light beams being non-uniform. Furthermore, the upper BEF 121, the lower BEF 122, the diffusing film 124, the LGP 126, the reflective film 128, and the light source 127 are all separate components of the backlight module 120. This makes the process of assembly of the backlight module 120 rather complicated, and increases the rate of defects occurring in mass production of the backlight module 120.

What is needed, therefore, is a backlight module that can overcome the above-described deficiencies. What is also needed is an LCD device employing such a backlight module.

SUMMARY

An aspect of the invention relates to a one-piece backlight module. The backlight module includes a brightness enhancement unit, and a light emitting unit including a first electrode layer, a second electrode layer, and a light emitting layer between the first and second electrode layers. The brightness enhancement unit and the light emitting unit are stacked one above the other.

Another aspect of the invention relates to a liquid crystal display device. The liquid crystal display device includes a first polarizing film, a second polarizing film, a liquid crystal panel between the first and second polarizing films, and a backlight module. The backlight module is adjacent to the second polarizing film, the backlight module and the liquid crystal panel are at opposite sides of the second polarizing film. The backlight module includes a brightness enhancement unit, and a light emitting unit including a first electrode layer, a second electrode layer, and a light emitting layer between the first and second electrode layers. The brightness enhancement unit and the light emitting unit are gaplessly interfaced with each other as portions of a single body.

A further aspect of the invention also relates to a liquid crystal display device. The liquid crystal display device includes a liquid crystal panel, and a one-piece backlight module. The one-piece backlight module is positioned to provide light beams to the liquid crystal panel. The backlight module includes a polarizing unit, and a light emitting unit including a first electrode layer, a second electrode layer, and a light emitting layer between the first and second electrode layers. The polarizing unit and the light emitting unit are stacked one above the other.

Other novel features and advantages will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of various embodiments of the present invention. In the drawings, like reference numerals designate corresponding parts throughout various views, and all the views are schematic.

DETAILED DESCRIPTION OF PREFERRED EMBODIMENTS

Reference will now be made to the drawings to describe preferred embodiments of the present invention in detail.

Figure 1:
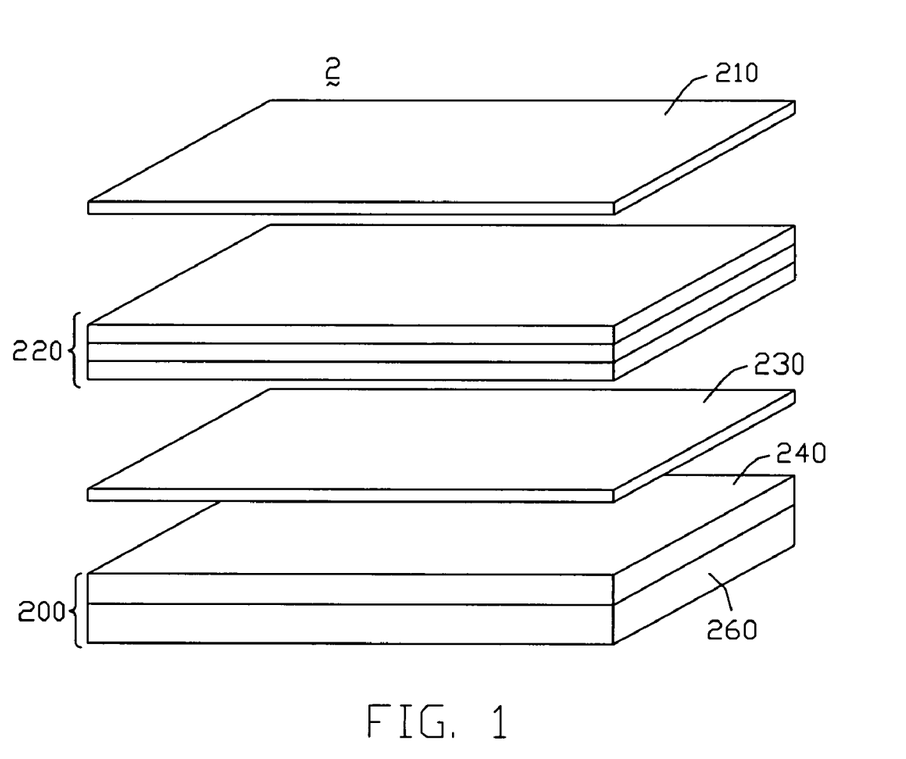
FIG. 1 is an exploded, isometric view of an LCD device according to a first embodiment of the present invention, the LCD device including a backlight module.

Referring to FIG. 1, an LCD device according to a first embodiment of the present invention is shown. The LCD device 2 includes an upper polarizing film 210, a liquid crystal panel 220, a lower polarizing film 230, and a one-piece backlight module 200, arranged in that order from top to bottom. A polarizing direction of the upper polarizing film 210 is perpendicular to that of the lower polarizing film 230. The backlight module 200 includes a brightness enhancement unit 240, and a light emitting unit 260 under the brightness enhancement unit 240. The brightness enhancement unit 240 and the light emitting unit 260 are in immediate contact with each other. That is, the brightness enhancement unit 240 and the light emitting unit 260 are gaplessly interfaced with each other.

Figure 2:
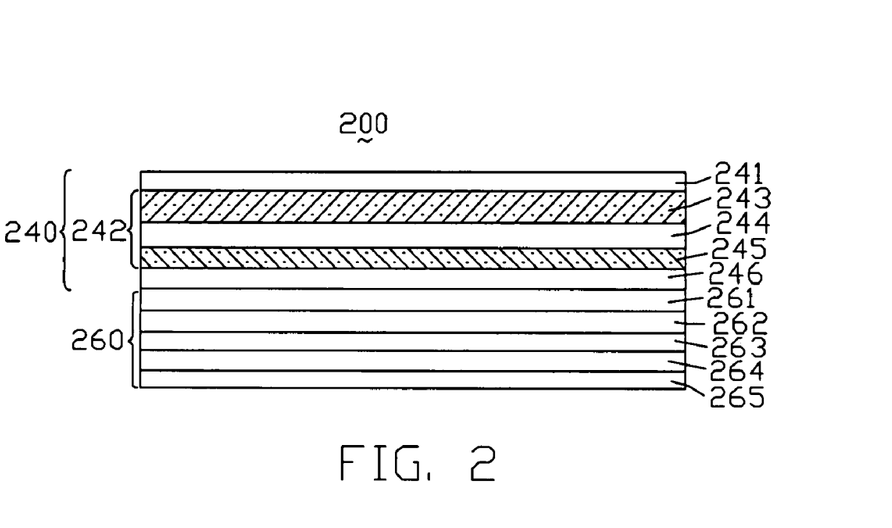
FIG. 2 is a side cross-sectional view of the backlight module of FIG. 1.

Also referring to FIG. 2, the brightness enhancement unit 240 includes an upper protective layer 241, a prism unit 242, and a lower protective layer 246, arranged in that order from top to bottom. The upper and lower protective layers 241, 246 are formed on the prism unit 242 by a spread coating method. The upper and lower protective layers 241, 246 are provided for protecting the prism unit 242. The prism unit 242 includes an upper prism layer 243, a main body 244, and a lower prism layer 245. The upper prism layer 243 and the lower prism layer 245 are coated on surfaces of two opposite sides of the main body 244. An orientation of prism structures (not shown) of the upper prism layer 243 is perpendicular to that of prism structures (not shown) of the lower prism layer 245. The prism unit 242 has a refraction index $n_0$. The upper protective layer 241 covers the upper prism layer 243, and has a refraction index $n_1$. The lower protective layer 246 underlies the lower prism layer 245, and has a refraction index $n_2$. The refraction indices of the upper protective layer 241, the prism unit 242, and the lower protective layer 246 are governed by the following formula: $n_1 < n_0 < n_2$.

The light emitting unit 260 can be a planar light source, and includes an upper electrode layer 261, a light emitting layer 262, a dielectric layer 263, a lower electrode layer 264, and an insulating layer 265, arranged in that order from top to bottom. The upper electrode layer 261, the light emitting layer 262, the dielectric layer 263, the lower electrode layer 264, and the insulating layer 265 are all planar structures, and are formed by a spread coating method. The upper electrode layer 261 underlies the lower protective layer 246 of the brightness enhancement unit 240. That is, the backlight module 200 is an all-in-one structure with the elements of the brightness enhancement unit 240 and the light emitting unit 260 integrally formed from top to bottom to cooperatively form a single, unitary structure. The elements of the light emitting unit 260 can be sputter deposited on the brightness enhancement unit 240 one by one.

The light emitting layer 262 can be made from fluorescent materials. The upper and lower electrode layers 261, 264 provide voltages to the light emitting layer 262 for electrofluorescence. The dielectric layer 263 limits the discharging current between the upper electrode layer 261 and the lower electrode layer 264. When an AC (alternating current) voltage is applied between the upper electrode layer 261 and the lower electrode layer 264, the light emitting layer 262 emits uniform light beams from the whole of a planar interface thereof.

Because the refraction index $n_2$ of the lower protective layer 246 is greater than the refraction index $n_0$ of the lower prism layer 245, when the uniform light beams enter the lower prism layer 245 from the lower protective layer 246, the angle of refraction is smaller than the angle of incidence (according to Snell's law). The refraction index of the upper prism layer 243 and the refraction index of the lower prism layer 245 are each similar to that of the main body 244. Accordingly, the light beams pass through the lower prism layer 245, the main body 244, and the upper prism layer 243 along approximately rectilinear directions. Because the refraction index $n_1$ of the upper protective layer 241 is less than the refraction index $n_0$ of the upper prism layer 243, when the uniform light beams enter the upper protective layer 241 from the upper prism layer 243, the angle of refraction is greater than the angle of incidence (according to Snell's law). Thus overall, portions of the uniform light beams that are originally incident on the lower protective layer 246 in slantwise directions are transformed to exit the upper protective layer 241 in directions substantially perpendicular to the upper protective layer 241. That is, the backlight module 200 provides improved light concentration. This means the backlight module 200 can provide light beams with high brightness to the liquid crystal panel 220.

In summary, the light emitting unit 260 and the brightness enhancement unit 240 are integrally formed together as a single, unitary body. Unlike certain conventional backlight modules, the backlight module 200 is a planar direct type backlight unit, which emits uniform light beams without the need for an LGP and reflectors. The process of manufacturing the backlight module 200 is simple and convenient, and the rate of defects occurring in mass production of the backlight module 200 can be reduced.

Figure 3:
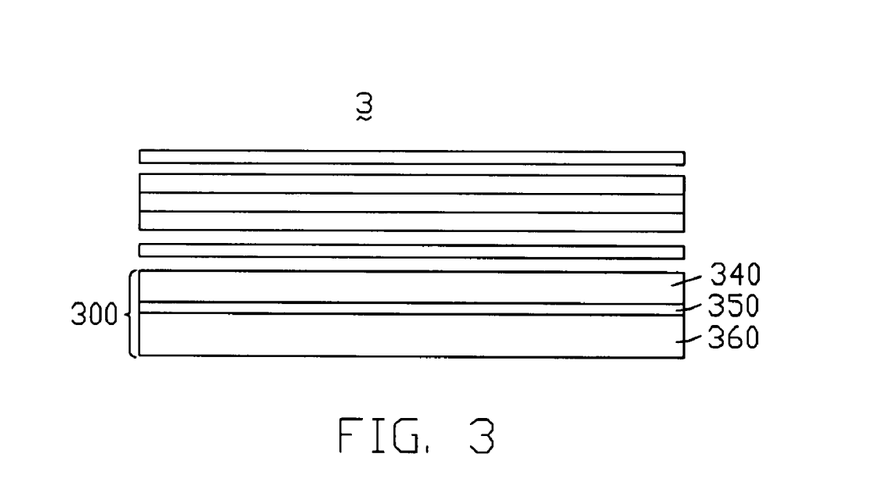
FIG. 3 is an exploded, side view of an LCD device according to a second embodiment of the present invention.

Referring to FIG. 3, an LCD device according to a second embodiment of the present invention is shown. The LCD device 3 is similar to the LCD device 2. However, a one-piece backlight module 300 of the LCD device 3 includes a brightness enhancement unit 340, a diffusing film 350, and a light emitting unit 360, arranged in that order from top to bottom. The diffusing film 350 improves the diffusion of light beams emitted from the light emitting unit 360.

The brightness enhancement unit 340, the diffusing film 350, and the light emitting unit 360 are integrally formed together as a single, unitary body. Therefore the process of manufacturing the backlight module 300 is simple and convenient, and the rate of defects occurring in mass production of the backlight module 200 can be reduced.

Figure 4:
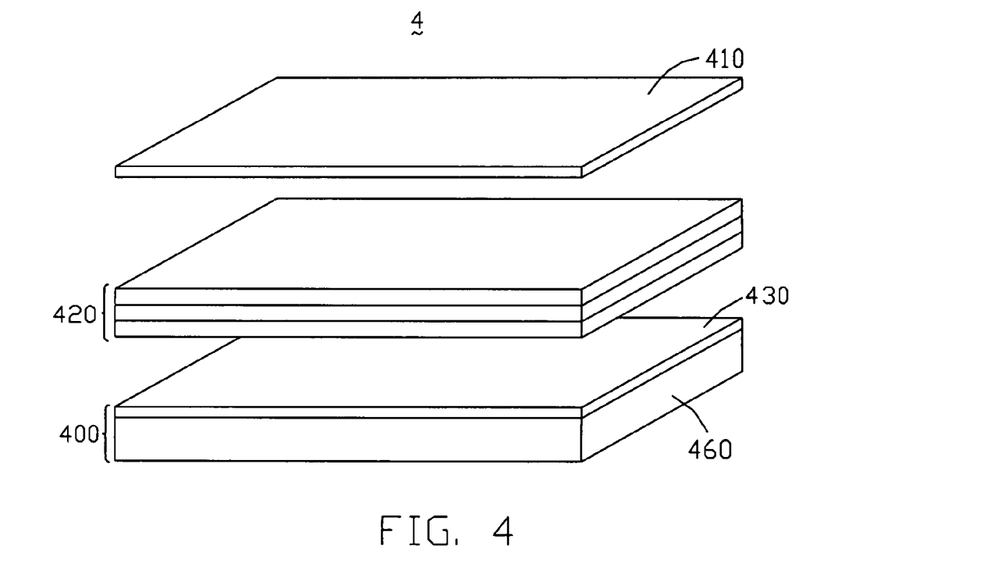
FIG. 4 is an exploded, isometric view of an LCD device according to a third embodiment of the present invention, the LCD device including a backlight module.

Referring to FIG. 4, an LCD device according to a third embodiment of the present invention is shown. The LCD device 4 includes a polarizing film 410, a liquid crystal panel 420, and a one-piece backlight module 400. The polarizing film 410 and the backlight module 400 are disposed on two opposite sides of the liquid crystal panel 420, respectively. The backlight module 400 provides planar light beams to the liquid crystal panel 420. The backlight module 400 includes a polarizing unit 430 and a light emitting unit 460. The polarizing unit 430 and the light emitting unit 460 are in immediate contact with each other. That is, the polarizing unit 430 and the light emitting unit 460 are gaplessly interfaced with each other.

Figure 5:
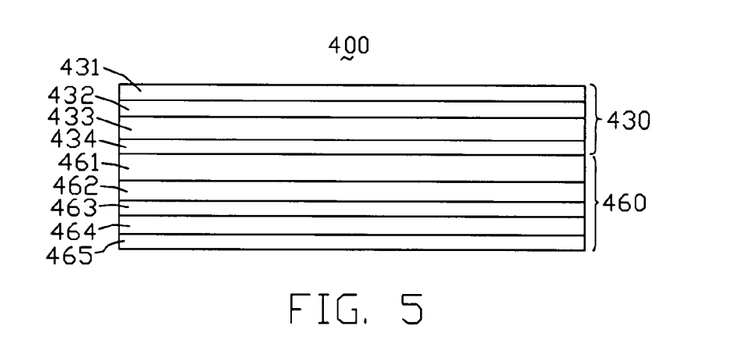
FIG. 5 is a side cross-sectional view of the backlight module of FIG. 4.

Referring also to FIG. 5, the polarizing unit 430 includes an adhesive layer 431, a protective film 432, a polarizing base 433, and a supporting layer 434, arranged in that order from top to bottom. The adhesive layer 431, the protective film 432, the polarizing base 433, and the supporting layer 434 are all planar structures. The protective film 432 protects the polarizing base 433. The supporting layer 434 supports the polarizing base 433. The protective film 432 and the supporting layer 434 are preferably made from triacetyl cellulose (TAC). The polarizing base 433 is preferably made from polyvinyl alcohol (PVA). The polarizing unit 430 has a structure substantially the same as that of the polarizing film 410. However, a polarizing direction of the polarizing unit 430 is perpendicular to that of the polarizing film 410.

The light emitting unit 460 can be a planar light source. In this embodiment, the light emitting unit 460 includes an upper electrode layer 461, a light emitting layer 462, a dielectric layer 463, a lower electrode layer 464, and an insulating layer 465, arranged in that order from top to bottom. The upper electrode layer 461, the light emitting layer 462, the dielectric layer 463, the lower electrode layer 464, and the insulating layer 465 are all planar structures, and are formed by a spread coating method. The upper electrode layer 461 underlies the supporting layer 434 of the polarizing unit 430. That is, the backlight module 400 is an all-in-one structure with the elements of the polarizing unit 430 and the light emitting unit 460 integrally formed from top to bottom to cooperatively form a single, unitary structure. The elements of the light emitting unit 460 can be sputter deposited on the polarizing unit 430 one by one.

The light emitting layer 462 can be made from fluorescent materials. The upper and lower electrode layers 461, 464 provide voltages to the light emitting layer 462 for electrofluorescence. The dielectric layer 463 limits the discharging current between the upper electrode layer 461 and the lower electrode layer 464. When an AC voltage is applied between the upper electrode layer 461 and the lower electrode layer 464, the light emitting layer 462 emits uniform light beams from the whole of a planar interface thereof.

In summary, the light emitting unit 460 and the polarizing unit 430 are integrally formed together as a single, unitary body. Unlike certain conventional backlight modules, the backlight module 400 is a planar direct type backlight unit, which emits uniform light beams without the need for an LGP and reflectors. The process of manufacturing the backlight module 400 is simple and convenient, and the rate of defects occurring in mass production of the backlight module 400 can be reduced.

Figure 6:
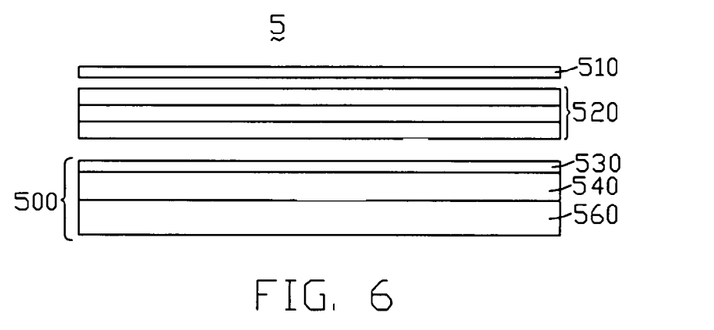
FIG. 6 is an exploded, side view of an LCD device according to a fourth embodiment of the present invention, the LCD device including a backlight module.

Referring to FIG. 6, an LCD device according to a fourth embodiment of the present invention is shown. The LCD device 5 includes a polarizing film 510, a liquid crystal panel 520, and a one-piece backlight module 500. The polarizing film 510 and the backlight module 500 are disposed at two opposite sides of the liquid crystal panel 520, respectively. The backlight module 500 provides planar light beams to the liquid crystal panel 520. The backlight module 500 includes a polarizing unit 530, a brightness enhancement unit 540, and a light emitting unit 560, stacked in that order from top to bottom. The polarizing unit 530 and the brightness enhancement unit 540 are in immediate contact with each other, and the brightness enhancement unit 540 and the light emitting unit 560 are in immediate contact with each other. That is, the polarizing unit 530 and the brightness enhancement unit 540 are gaplessly interfaced with each other, and the brightness enhancement unit 540 and the light emitting unit 560 are gaplessly interfaced with each other.

Figure 7:
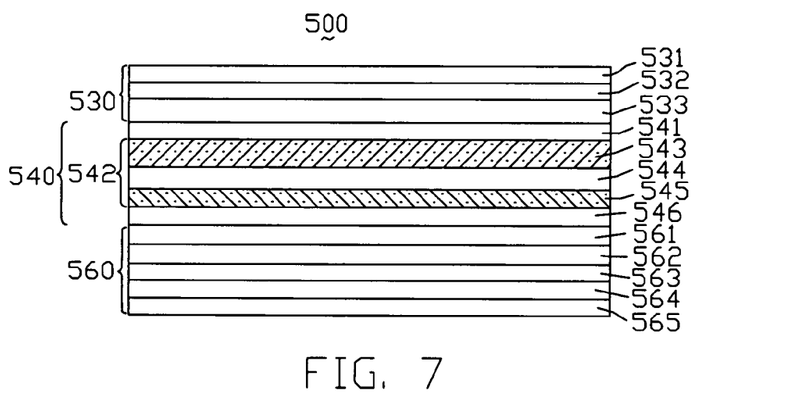
FIG. 7 is a side cross-sectional view of the backlight module of FIG. 6.

Referring also to FIG. 7, the polarizing unit 530 includes an adhesive layer 531, a protective film 532, and a polarizing base 533, arranged in that order from top to bottom. The adhesive layer 531, the protective film 532, and the polarizing base 533 are all planar structures, and are formed by a spread coating method. The protective film 532 protects the polarizing base 533. The protective film 532 is preferably made from TAC, and the polarizing base 533 is preferably made from PVA. The polarizing base 533 has a structure substantially the same as that of the polarizing film 510. However, a polarizing direction of the polarizing unit 530 is perpendicular to that of the polarizing film 510.

The brightness enhancement unit 540 includes an upper protective layer 541, a prism unit 542, and a lower protective layer 546, arranged in that order from top to bottom. The upper protective layer 541, the prism unit 542, and the lower protective layer 546 are all planar structures, and are formed by a spread coating method. The prism unit 542 has a refraction index $n_0$, the upper protective layer 541 has a refraction index $n_1$, and the lower protective layer 546 has a refraction index $n_2$. The refraction indices of the upper protective layer 541, the prism unit 542, and the lower protective layer 546 are governed by the following formula: $n_1 < n_0 < n_2$. The prism unit 542 includes an upper prism layer 543, a main body 544, and a lower prism layer 545. The upper prism layer 543 and the lower prism layer 545 are coated on surfaces of two opposite sides of the main body 544. An orientation of prism structures (not shown) of the upper prism layer 543 is perpendicular to that of prism structures (not shown) of the lower prism layer 545. The upper protective layer 541 underlies the polarizing base 533 of the polarizing unit 530, so that the upper protective layer 541 supports the polarizing base 533 as well as protecting the upper prism layer 543. The lower protective layer 546 underlies and protects the lower prism layer 545.

The light emitting unit 560 includes an upper electrode layer 561, a light emitting layer 562, a dielectric layer 563, a lower electrode layer 564, and an insulating layer 565, arranged in that order from top to bottom. The upper electrode layer 561, the light emitting layer 562, the dielectric layer 563, the lower electrode layer 564, and the insulating layer 565 are all planar structures, and are formed by a spread coating method. The upper electrode layer 561 underlies the lower protective layer 546 of the brightness enhancement unit 540. That is, the backlight module 500 is an all-in-one structure with the elements of the polarizing unit 530, the brightness enhancement unit 540, and the light emitting unit 560 integrally formed from top to bottom to cooperatively form a single, unitary structure.

The light emitting layer 562 can be made from fluorescent materials. The upper and lower electrode layers 561, 564 provide voltages to the light emitting layer 562 for electrofluorescence. The dielectric layer 563 limits the discharging current between the upper electrode layer 561 and the lower electrode layer 564. When an AC voltage is applied between the upper electrode layer 561 and the lower electrode layer 564, the light emitting layer 562 emits uniform light beams from the whole of a planar interface thereof.

In summary, the polarizing unit 530, the brightness enhancement unit 540, and the light emitting unit 560 are integrally formed together as a single, unitary body. Unlike certain conventional backlight modules, the backlight module 500 is a planar direct type backlight unit, which emits uniform light beams without the need for an LGP and reflectors. The process of manufacturing the backlight module 500 is simple and convenient, and the rate of defects occurring in mass, production of the backlight module 500 can be reduced.

Figure 8:
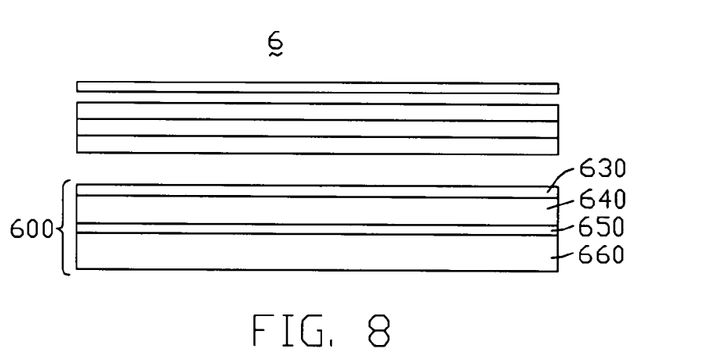
FIG. 8 is an exploded, side view of an LCD device according to a fifth embodiment of the present invention.

Referring to FIG. 8, an LCD device according to a fifth embodiment of the present invention is shown. The LCD device 6 is similar to the LCD device 5. However, a one-piece backlight module 600 of the LCD device 6 includes a polarizing unit 630, a brightness enhancement unit 640, a diffusing film 650, and a light emitting unit 660, arranged in that order from top to bottom. The diffusing film 650 improves the diffusion of light beams emitted from the light emitting unit 660.

The polarizing unit 630, the brightness enhancement unit 640, the diffusing film 650, and the light emitting unit 660 are integrally formed together as a single, unitary body. Therefore the process of manufacturing the backlight module 600 is simple and convenient, and the rate of defects occurring in mass production of the backlight module 600 can be reduced.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A backlight module, comprising:
a brightness enhancement unit comprising a first protective layer, a second protective layer, and a prism unit between the first and second protective layers; and
a light emitting unit comprising a first electrode layer disposed adjacent to the second protective layer, a second electrode layer, and a light emitting layer between the first and second electrode layers;
wherein the brightness enhancement unit and the light emitting unit are stacked one above the other, and the second protective layer covers the first electrode layer;
wherein the prism unit has a refraction index $n_0$, the first protective layer has a refraction index $n_1$, the second protective layer has a refraction index $n_2$, the refraction index $n_1$ is less than the refraction index $n_2$, and the refraction index $n_0$ is between the refraction index $n_1$ and the refraction index $n_2$.

2. The backlight module as claimed in claim 1, wherein the prism unit comprises a first prism layer, a second prism layer, and a main body between the first and second prism layers, and an orientation of prism structures of the first prism layer is substantially perpendicular to that of prism structures of the second prism layer.

3. The backlight module as claimed in claim 1, further comprising a diffusing film integrally formed between the second protective layer of the brightness enhancement unit and the first electrode layer of the light emitting unit.

4. The backlight module as claimed in claim 1, further comprising a polarizing unit, wherein the polarizing unit comprises an adhesive layer, a polarizing base, and a protective film between the adhesive layer and the polarizing base, and the polarizing base covers the first protective layer of the brightness enhancement unit.

5. A liquid crystal display device, comprising:
a liquid crystal panel; and
a backlight module positioned to provide light beams to the liquid crystal panel, the backlight module comprising:
a polarizing unit;
a brightness enhancement unit being gaplessly interfaced with the polarizing unit, and
a planar light emitting unit;
wherein the polarizing unit, the brightness enhancement unit, and the light emitting unit are integrally formed from top to bottom in that order to cooperatively form a single, unitary structure;
wherein the brightness enhancement unit comprises a first protective layer, a second protective layer, and a prism unit between the first and second protective layers, the prism unit has a refraction index $n_0$, the first protective layer has a refraction index $n_1$, the second protective layer has a refraction index $n_2$, the refraction index $n_1$ is less than the refraction index $n_2$, and the refraction index $n_0$ is between the refraction index $n_1$ and the refraction index $n_2$.

6. The liquid crystal display device as claimed in claim 5, wherein the polarizing unit comprises an adhesive layer, a polarizing base, and a protective film between the adhesive layer and the polarizing base.

7. The liquid crystal display device as claimed in claim 6, wherein the first protective layer of the brightness enhancement unit underlies the polarizing base of the polarizing unit.

8. The liquid crystal display device as claimed in claim 7, wherein the light emitting unit comprises a first electrode layer, a second electrode layer, and a light emitting layer between the first and second electrode layers.

9. The liquid crystal display device as claimed in claim 8, wherein the second protective layer of the brightness enhancement unit covers the first electrode layer of the light emitting unit, and the brightness enhancement unit and the light emitting unit are gaplessly interfaced with each other.

10. The liquid crystal display device as claimed in claim 8, wherein the backlight module further comprises a diffusing film integrally formed between the second protective layer of the brightness enhancement unit and the first electrode layer of the light emitting unit.

11. The liquid crystal display device as claimed in claim 8, wherein the light emitting unit further comprises a dielectric layer integrally formed between the light emitting layer and the second electrode layer thereof.

12. The backlight module as claimed in claim 1, wherein the bright enhancement unit and the light emitting unit are gaplessly interfaced with each other.

13. The backlight module as claimed in claim 4, wherein the polarizing unit and the bright enhancement unit are gaplessly interfaced with each other, and the bright enhancement unit and the light emitting unit are gaplessly interfaced with each other.

14. The backlight module as claimed in claim 4, further comprising a diffusing film integrally formed between the second protective layer of the brightness enhancement unit and the first electrode layer of the light emitting unit.

15. The backlight module as claimed in claim 14, wherein the polarizing unit, the brightness enhancement unit, the diffusing film, and the light emitting unit are integrally formed together as a single, unitary body.

16. The backlight module as claimed in claim 1, wherein the light emitting unit further a dielectric layer gaplessly interposed between the light emitting layer and the second electrode layers to limit discharging current between the first electrode layer and the second electrode layer.

17. The backlight module of claim 1, wherein the light emitting unit further comprising an insulating layer attached to a side of the second electrode layer opposite to the light emitting layer.

18. The liquid crystal display device of claim 5, wherein the prism unit comprises a first prism layer, a second prism layer, and a main body between the first and second prism layers, and an orientation of prism structures of the first prism layer is substantially perpendicular to that of prism structures of the second prism layer.

* * * * *

UNITED STATES PATENT AND TRADEMARK OFFICE
CERTIFICATE OF CORRECTION

Page 1 of 1

PATENT NO. : 8,023,066 B2
APPLICATION NO. : 11/901373
DATED : September 20, 2011
INVENTOR(S) : Kai Meng and Che-Kuei Mai It is certified that error appears in the above-identified patent and that said Letters Patent is hereby corrected as shown below:

Please replace Section (73) regarding "Assignees" on the Title page of the Patent with the following:

(73) Assignees: Innocom Technology (Shenzhen) Co., Ltd., Shenzhen, Guangdong Province (CN); Chimei Innolux Corporation, Miao-Li County (TW).

Signed and Sealed this
Twenty-second Day of November, 2011

David J. Kappos
*Director of the United States Patent and Trademark Office*